US012722028B2

(12) United States Patent
Cantin et al.

(10) Patent No.: US 12,722,028 B2
(45) Date of Patent: Sep. 1, 2026

(54) WATER RESISTANT PROTECTIVE GARMENT

(71) Applicant: Elevate Textiles, Inc., Greensboro, NC (US)

(72) Inventors: Jacques A Cantin, Greenville, SC (US); Guy Connors Lucas, Charlotte, NC (US); Kiarash Arangdad, Greensboro, NC (US)

(73) Assignee: Elevate Textiles, Inc., Greensboro, NC (US)

( * ) Notice: Subject to any disclaimer, the term of this patent is extended or adjusted under 35 U.S.C. 154(b) by 0 days.

(21) Appl. No.: 18/648,659

(22) Filed: Apr. 29, 2024

(65) Prior Publication Data

US 2024/0285983 A1 Aug. 29, 2024

Related U.S. Application Data

(63) Continuation of application No. 16/874,913, filed on May 15, 2020.

(60) Provisional application No. 62/951,328, filed on Dec. 20, 2019, provisional application No. 62/849,248, filed on May 17, 2019.

(51) Int. Cl.

| | |
|---|---|
| ***A62B 17/00*** | (2006.01) |
| ***A41D 27/04*** | (2006.01) |
| ***A41D 31/02*** | (2019.01) |
| ***A41D 31/08*** | (2019.01) |
| ***B32B 27/12*** | (2006.01) |
| ***B32B 27/34*** | (2006.01) |
| ***D06M 101/36*** | (2006.01) |

(52) U.S. Cl.

CPC ............ *A62B 17/003* (2013.01); *A41D 27/04* (2013.01); *A41D 31/02* (2013.01); *A41D 31/085* (2019.02); *B32B 27/12* (2013.01); *B32B 27/34* (2013.01); *B32B 2307/306* (2013.01); *B32B 2307/7265* (2013.01); *B32B 2437/00* (2013.01); *D06M 2101/36* (2013.01); *D06M 2200/12* (2013.01)

(58) Field of Classification Search

CPC ...... A41D 31/02; A41D 31/08; A41D 31/102; D06M 15/263; D06M 2101/36; D06M 2200/12

See application file for complete search history.

(56) References Cited

U.S. PATENT DOCUMENTS

| | | | | |
|---|---|---|---|---|
| 3,382,202 | A * | 5/1968 | Forrester .................. | C08K 5/20 524/227 |
| 5,516,578 | A | 5/1996 | Coppens | |
| 6,192,520 | B1 | 2/2001 | Underwood et al. | |
| 7,581,260 | B2 | 9/2009 | Underwood et al. | |

(Continued)

FOREIGN PATENT DOCUMENTS

| | | |
|---|---|---|
| WO | WO 2018/031534 | 2/2018 |

OTHER PUBLICATIONS

EP Search Report Application No. 20175195.5-1107 dated Oct. 1, 2020.

*Primary Examiner* — Peter Y Choi

(74) *Attorney, Agent, or Firm* — Dority & Manning, P.A.

(57) ABSTRACT

Protective garments are disclosed having a fabric material treated with a durable water resistant treatment. In accordance with the present disclosure, the durable water resistant treatment is substantially free of fluorocarbon chemicals and yet provides not only excellent water resistance, but also has excellent durability properties.

17 Claims, 4 Drawing Sheets

(56) References Cited

U.S. PATENT DOCUMENTS

| | | | |
|---|---|---|---|
| 8,296,974 B2 | 10/2012 | Sonnenschein et al. | |
| 8,793,814 B1 | 8/2014 | Dilanni et al. | |
| 8,969,492 B2 | 3/2015 | Fuchs et al. | |
| 2006/0292323 A1* | 12/2006 | Hutchinson ............. | C08J 7/046 427/407.1 |
| 2013/0254980 A1 | 10/2013 | Underewood et al. | |
| 2015/0239007 A1 | 8/2015 | Selwyn | |
| 2016/0090505 A1 | 3/2016 | Sworen et al. | |
| 2016/0090560 A1 | 3/2016 | Sworen et al. | |
| 2017/0030010 A1 | 2/2017 | Baumann | |
| 2017/0204558 A1 | 7/2017 | Knaup | |
| 2017/0314189 A1 | 11/2017 | Curran et al. | |
| 2018/0223458 A1 | 8/2018 | Truesdale, III | |

* cited by examiner

100 - NO STICKING OR WETTING OF THE SPECIMEN FACE

90 - SLIGHT RANDOM STICKING OR WETTING OF THE SPECIMEN FACE

80 - WETTING OF SPECIMEN FACE AT SPRAY POINTS

70 - PARTIAL WETTING OF THE SPECIMEN FACE BEYOND THE SPRAY POINTS

50 - COMPLETE WETTING OF THE ENTIRE SPECIMEN FACE BEYOND THE SPRAY POINTS

0 - COMPLETE WETTING OF THE ENTIRE FACE OF THE SPECIMEN

WATER RESISTANT PROTECTIVE GARMENT

RELATED APPLICATIONS

The present application is a continuation application and is based on and claims priority to U.S. patent application Ser. No. 16/874,913 having a filing date of May 15, 2020, which is based upon and claims priority to U.S. Provisional Patent application Ser. No. 62/951,328, filed on Dec. 20, 2019, and U.S. Provisional Patent application Ser. No. 62/849,248 filed on May 17, 2019 all of which are incorporated herein by reference.

BACKGROUND

Various different types of protective garments exist that are intended to provide protection to the wearer. In certain embodiments, for instance, the protective garments are designed to provide protection from heat and flame so as to prevent burn injuries. Such protective garments, for instance, are typically worn by firefighters, other service providers, and military personnel. Military personnel, for instance, wear such garments to provide protection against incendiary devices and the like.

Such garments should be fire resistant while also being as light as possible, strong, abrasion resistant, rip and tear resistant, flexible, and should encumber the wearer as little as possible.

Conventional firefighter garments, for instance, are generally constructed having a number of discrete layers. Typically, these layers include an outer shell, a moisture barrier layer, a thermal barrier layer, and an inner lining. The layers are generally made from appropriate thermally-resistant materials to provide protection against heat and flame.

In the past, one difficulty that has been encountered in designing protective garments is to prevent the garments from absorbing and retaining moisture. For instance, protective garments worn by fire fighters usually become wet during use due to external exposure to extinguishing water or rain. Also, protective garments can become wet due to the absorption of perspiration given off by the wearer. Unfortunately, when the protective garment absorbs moisture, the characteristics and properties of the garment can be adversely affected. For example, when retaining moisture, the protective garment can become significantly heavier.

Besides increasing in weight, the presence of moisture within a protective garment also adversely affects the thermal properties of the garment making the garment less effective in shielding its wearer from thermal heat. In particular, since water is a much better heat conductor than air, the rate of heat transfer through the garment increases. Also, it has been discovered that as water heats up in a protective garment, the water can turn to steam under exposure to heat and actually burn a person wearing the garment.

Ultimately, when protective garments as described above become wet or soaked with water or other fluids, the garments become hot and uncomfortable to work in due to the increased weight and due to the increased rate of heat transfer through the garment. As a consequence, a wearer can only spend a limited amount of time working or performing tasks in the garment due to the possibility of heat stress.

In the past, in order to prevent water from being absorbed by protective garments, the garments have been treated with a water resistant composition. For example, water resistant protective garments are disclosed in U.S. Pat. No. 6,192,520 and in U.S. Pat. No. 7,581,260, which are both incorporated herein by reference. The above patents are directed to inventions that have made great advances in the art.

In the past, however, water resistant treatments applied to protective garments, particularly protective garments containing inherently flame resistant fibers, have inevitably included fluorocarbon chemicals. The fluorocarbon chemicals are durable and provide excellent water resistance properties. Recently, however, various manufacturers including fabric makers have been placed under increased pressure to reduce the amount of fluorocarbons incorporated into products. Fluorocarbons, for instance, do not readily biodegrade and can remain in landfills for many years to come. In addition, the manufacture and handling of fluorocarbons has been subject to greater scrutiny and governmental regulation.

Thus, a need currently exists for an alternative water resistant treatment that can be applied to protective garments and provide water resistant properties without the need to use fluorocarbon chemicals. More particularly, a need exists for a water resistant treatment that is substantially or essentially free of fluorocarbon chemicals and that is capable of being applied to all different types of garments and garment layers, including firefighter garments, military garments, tactical garments, industrial workwear, and the like.

SUMMARY

In general, the present disclosure is directed to a durable water resistant treatment for flame resistant fabrics that is substantially fluorocarbon-free. The durable water resistant treatment of the present disclosure, for instance, can contain substantially no or can be completely devoid of fluoropolymers and yet still maintain excellent water resistant properties. The durable water resistant treatment is particularly well suited for use on fabrics containing inherently flame resistant fibers. It was unexpectedly discovered that the durable water resistant treatment of the present disclosure not only has excellent water resistant properties, but is capable of maintaining the water resistant properties even after multiple laundry cycles.

For example, in one embodiment, the present disclosure is directed to a protective garment. The protective garment includes at least one fabric layer that contains inherently flame resistant fibers. The at least one fabric layer, for instance, may be the outer layer of a protective garment, may comprise a liner for a protective garment, or may comprise any layer within a multi-layer composite. The inherently flame resistant fibers, for instance, may include para-aramid fibers, meta-aramid fibers, polybenzimidazole fibers, and mixtures thereof. In one embodiment, the outer shell material contains inherently flame resistant fibers in an amount of at least about 80% by weight. In accordance with the present disclosure, the fabric layer is treated with a durable water resistant treatment. For example, the fabric layer can be impregnated with the durable water resistant treatment. The durable water resistant treatment can be applied to the fabric layer using various techniques, such as by being dipped into a bath, by spraying the durable water resistant treatment on to the fabric layer, or by printing the durable water resistant treatment on to the fabric layer.

The durable water resistant treatment is free of fluorocarbons. The durable water resistant treatment is incorporated into the fabric material such that the material maintains a spray rating of at least 70, such as at least 80, such as at least 90, after ten laundry cycles. The fabric material can also maintain a water absorption of less than about 15%, such as less than about 10%, such as less than about 8%, such as less than about 5%, such as less than about 3%, such as less than about 2% after five laundry cycles or after ten laundry cycles.

The durable water resistant treatment of the present disclosure generally contains at least one polyurethane polymer. The polyurethane polymer, for instance, may be a polyester/ether polyurethane polymer, such as an anionic, aliphatic polyester/ether polyurethane. In one embodiment, the durable water resistant treatment includes a first polyurethane polymer as described above combined with a second polyurethane polymer. The second polyurethane polymer may comprise a blocked isocyanate. The weight ratio between the first polyurethane polymer and the second polyurethane polymer can be from about 5:1 to about 1:2, such as from about 3:1 to about 1.5:1. The fabric layer treated in accordance with the present disclosure can be substantially free of fluorocarbons. For instance, the fabric layers can contain fluorine in an amount less than about 1,000 ppm, such as in an amount less than about 500 ppm, such as in an amount less than about 100 ppm. In various embodiments, the fluorine content of the resulting fabric layer can be less than about 50 ppm, such as less than about 40 ppm, such as less than about 30 ppm, such as less than about 20 ppm.

In addition to at least one polyurethane polymer, the durable water resistant treatment can contain various other components and ingredients. In one embodiment, for instance, the durable water resistant treatment contains a softener. The softener may comprise a polyalkylene polymer, such as a polyethylene polymer. The durable water resistant treatment can also contain an acrylic polymer, a wax such as a paraffin wax, and mixtures thereof.

As described above, the fabric material generally contains inherently flame resistant fibers. The fabric material, for instance, can be made from spun yarns, multifilament yarns, monofilament yarns, stretch broken yarns and mixtures thereof. In one embodiment, the outer shell material includes a combination of spun yarns and multifilament yarns.

Fabric materials treated in accordance with the present disclosure can have an excellent balance of properties in addition to possessing an excellent spray rating. For example, when test according to NFPA 1971 8.25, the fabric material can display a water absorption of less than about 10%, such as less than about 7%, such as less than about 5%, such as less than about 3%. The fabric material can also provide protection against various chemical agents, such as acids, alkaline materials, and synthetic blood. When tested according to test EN ISO 6530, for instance, the fabric material can have an index of repellency of greater than about 85% and an index of penetration of less than about 1% when tested against a 30% sulfuric acid solution, can display an index of repellency of greater than 90% and an index of penetration of less than 1% when tested against a 10% sodium hydroxide solution, and can display an index of repellency of greater than about 85% and an index of penetration of less than about 1.5% when tested against artificial blood.

Fabric materials according to the present disclosure also have increased abrasion resistance. For example, fabrics having a basis weight of from about 5 osy to about 9 osy (e.g. outer shell materials) can have an abrasion resistance of greater than about 90,000 cycles, such as greater than about 95,000 cycles when tested according to ASTM D4966 Test Method. Fabrics having a basis weight of from about 2 osy to about 4 osy (e.g. liner materials) can have an abrasion resistance of greater than about 40,000 cycles when tested according to ASTM D4966 Test Method.

In one embodiment, the protective garment of the present disclosure is a firefighter's garment. The garment can include an inner lining shaped to cover at least a portion of a wearer's body. The inner lining is configured in the garment to face the wearer. The outer shell material can be a covering over the inner lining. Any portion of the protective garment can be treated in accordance with the present disclosure, including the inner lining, the outer shell material, or any layers therebetween.

In alternative embodiments, the protective garment may comprise a fire resistant hood, fire resistant footwear, or fire resistant gloves.

Other features and aspects of the present disclosure are discussed in greater detail below.

BRIEF DESCRIPTION OF THE DRAWINGS

A full and enabling disclosure of the present disclosure is set forth more particularly in the remainder of the specification, including reference to the accompanying figures, in which.

Figure 1:
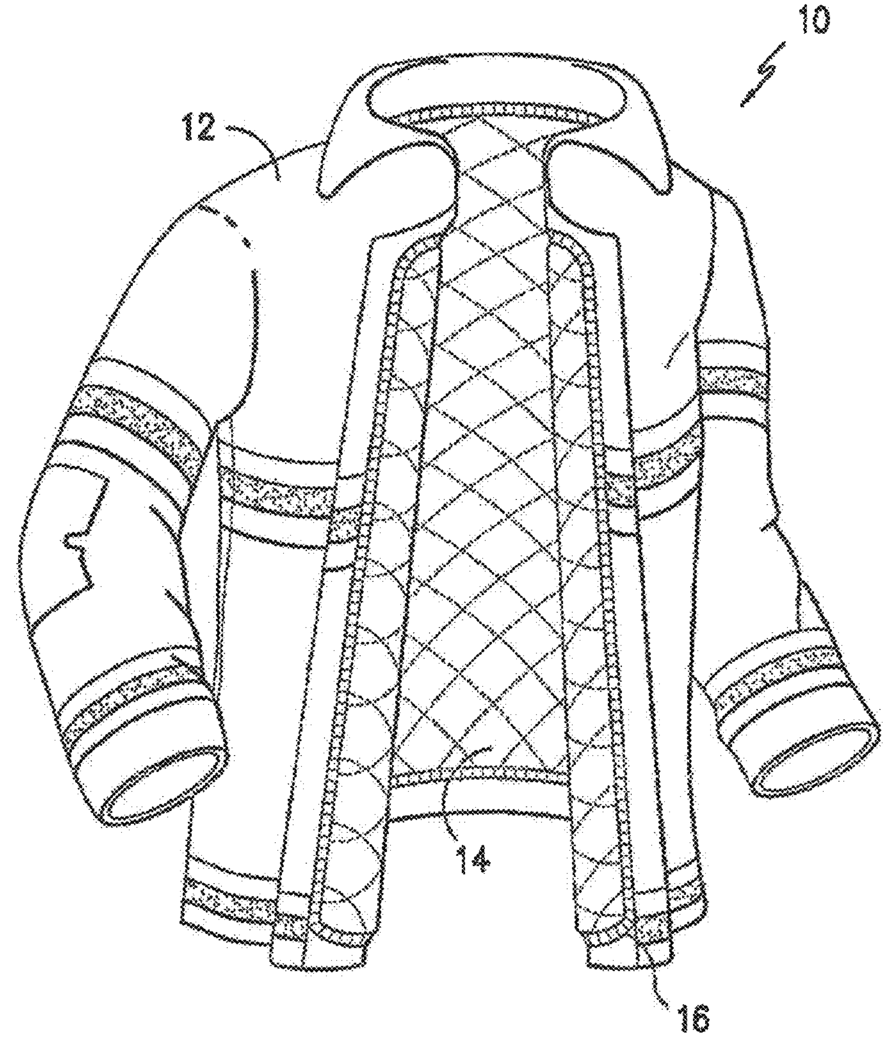
FIG. 1 is a perspective view of one embodiment of a protective garment made in accordance with the present disclosure.

Repeat use of reference characters in the present specification and drawings is intended to represent the same or analogous features or elements of the present invention.

DEFINITIONS AND STANDARDIZED PROCEDURES

The following definitions and procedures are offered in order to better describe and quantify the performance of protective garments and fabrics made according to the present invention in comparison to prior art constructions.

Water Repellency: Spray Test AATCC TM22-2017

As used herein, a fabric spray rating refers to a rating a fabric or a material receives according to AATCC TM22-2017. In general, a spray test measures the resistance of a material to wetting by water.

According to the present invention, the following is the procedure used to determine the spray rating of a material.

1. A 7"×7" sample of the material to be tested is first conditioned at 65 plus or minus 2% relative humidity and at 70 plus or minus 2° F. for a minimum of four hours prior to testing.
2. The fabric sample is fastened securely on a 6" metal hoop so that the fabric is wrinkle free. The hoop is supported on a tester's stand so that the fabric is facing up. Twills, gabardines, piques or similar fabrics of ribbed construction are positioned on the stand so that the ribs are diagonal to the flow of water running off the fabric. A funnel attached to a nozzle for holding water is placed 6" above the center of the fabric.
3. 250 milliliters of water at 80 plus or minus 2° F. are poured from a cup or other container into the funnel, allowing the water to spray onto the fabric.

4. Once the water has run through the funnel, one edge of the hoop is held and the opposite edge is firmly rapped once against a solid object with the fabric facing the object. The hoop is then rotated 180° and it is rapped once more at the point previously held.
5. The wetted or spotted fabric sample is then compared with the standards shown in FIGS. 3A-3F. The fabric is assigned a spray rating that corresponds to the nearest standard. As shown on FIGS. 3A-3F, the fabric can be rated from 0 to 100 wherein 0 indicates that the entire fabric is wetted with the water, while a rating of 100 indicates that none of the fabric was wetted by the water.

Aqueous Liquid Repellency: Water/Alcohol Solution Resistance Test (AATCC TM193-2017)

The following standardized water repellency test determines a material's resistance to wetting by aqueous liquids. In general, drops of a water-alcohol mixture of varying surface tensions are placed on the surface of the material and the extent of surface wetting is determined visually. The higher the rating a material receives is an indication of the material's resistance to staining by water-based substances. The composition of standard test liquids is as follows:

TABLE 1

Standard Test Liquids

| Water Repellency | Composition | |
|---|---|---|
| Rating Number | Isopropanol, % | Distilled Water, % |
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |

The Water Repellency Procedure is as Follows:

1. An 8"×8" sample of material is first conditioned at 65 plus or minus 2% relative humidity and at 70 plus or minus 2° F. for a minimum of four hours. The fabric is placed horizontally face up on white blotting paper.
2. Beginning with test liquid number 1, one drop of the liquid is placed at three locations on the material. Each drop placed on the material should be 2" apart.
3. The material is observed for 10 seconds from an approximate 45° angle.
4. If two of the three drops have not wet the fabric or do not show leaking into the fabric, drops of test liquid number 2 are placed on an adjacent site and step number 3 is repeated.
5. This procedure is continued until 2 of the 3 drops have wet or show wicking into the fabric. The water repellency rating is the highest numbered liquid for which 2 of the three drops do not wet or wick into the fabric.

Oil Repellency: Hydrocarbon Resistance Test (AATCC TM118-2013)

The following oil repellency test determines how well finished fabrics resist oily stains and wetting by organic liquids. In this test, drops of eight liquid hydrocarbons of various surface tensions are placed on the surface of the material and the extent of surface wetting is determined visually. The standard test liquids used are as follows:

TABLE 2

Oil Repellency Standard Test Liquids

| Hydrocarbon | Rating Number |
|---|---|
| Refined Mineral Oil | 1 |
| Refined Mineral Oil/n-Hexadecane 65/35% by volume at 21° C. | 2 |
| n-Hexadecane | 3 |
| n-Tetradecane | 4 |
| n-Dodecane | 5 |
| n-Decane | 6 |
| n-Octane | 7 |
| n-Heptane | 8 |

1. An 8"×8" sample of material is conditioned at 65 plus or minus 2% relative humidity and at 70 plus or minus 2° F. for a minimum of four hours before testing. The fabric is placed in a horizontal position face up on white blotting paper.
2. Beginning with liquid number 1, drops approximately 5 milliliters in diameter or 0.05 microliters in volume are placed on the test sample in several locations.
3. The drops are observed for 30 seconds from an approximate 45° angle. Wetting of the fabric is normally shown by darkening at the liquid/fabric interface. On black or dark fabrics, wetting can be detected by a loss of sparkle within the drop.
4. If liquid number 1 does not penetrate or wet the fabric or show wicking around the drops, drops of liquid number 2 are placed on adjacent portions of the fabric and observed for 30 seconds.
5. This procedure is continued until the fabric shows wetting under or around the drops of test liquid within 30 seconds. A sample's AATCC oil repellency rating is the number of the highest numbered test liquid that will not wet the fabric or show wicking within 30 seconds.

Dimensional Changes of Fabrics after Home Laundering AATCC TM135-2018

Laundering is preferably performed in a KENMORE automatic washer, followed by drying in a KENMORE automatic dryer. The following laundering test is used to determine the fabric's ability to withstand laundering. Typically, after laundering, the fabric is then subjected to the above-described spray test, water repellency test, and oil repellency test.

1. 8"×10" test specimens are combined with load fabrics (hemmed pieces of cotton sheeting or 50:50 fabric sheets having a size of 36"×36") to give a total dry load of 4 pounds.
2. The dials on the washer are set as follows:

| | |
|---|---|
| Water Level | High |
| Wash Cycle | Normal, 12 minutes |
| Temperature | Warm Wash, 105° F.; Cold Rinse |

The test pieces and dummy load are placed in the washer and the machine is started. One ounce of TIDE (Proctor & Gamble) detergent is added while the washer is filling with soft water. If the water hardness is greater than 5 ppm, CALGON water softener (Nalco) in the amount specified by the manufacturer is added to soften the water.

3. After the washing is complete, the wet fabric including the dummy load is placed in the automatic dryer. The dryer temperature dial is set to the proper point under high heat to give a maximum vent temperature of from about 155° F. to about 160° F. The time dial is set for "Normal Cycle" for 45 minutes. The machine is started and drying is allowed to continue until the cycle is complete. The above represents one laundry cycle.

4. The fabrics are then rewashed and redried until 10 cycles have been completed. Optionally, the test fabrics can be pressed with a hand iron, or the equivalent, at 280° F. to about 320° F. for 30 seconds on each side with the face side pressed last. The fabrics are then conditioned before testing for water is, repellency, oil repellency, or spray rating. As used herein, water repellency, oil repellency and spray ratings are all determined without ironing the fabric after being laundered, unless otherwise denoted.

Water Absorption Resistance Test

The following water absorption test is for determining the resistance to water absorption of a fabric or material. The test is based upon NFPA 1971-2018, 8-25. In particular, the water absorption test is conducted according to the above-identified test method after the fabric or material has been subjected to five laundry cycles in accordance with NFPA 1971, 8-1.2 (or AATCC TM135-2018-1,V, Ai).

According to the present invention, the following is the procedure used to determine the water absorption rating of a material.

1. Three 8"×8" samples of the material to be tested are subjected to five laundry cycles in accordance with NFPA 1971, 8-1.2. Test method NFPA 1972, 8-1.2 is substantially similar to the laundering test described above. In this test, however, the specimens are conditioned in an atmosphere of 70 plus or minus 2° F. and 65 plus or minus 2% relative humidity before and after being washed. Further, the machine settings and parameters are as follows:

| | |
|---|---|
| water level | normal |
| wash cycle | normal/cotton sturdy |
| wash temperature | 140+ or −5° F. |
| drying cycle | tumble/cotton sturdy |
| detergent | 66+ or −1 g of 1993 AATCC standard Reference Detergent |

2. Each sample is securely mounted, with the coated side of the material up, to embroidery hoops with sufficient tension to ensure a uniformly smooth surface. The hoop is supported on a tester's stand. The material is positioned so that the direction of the flow of water down the sample shall coincide with the warpwise direction of the sample as placed on the stand. A funnel attached to a nozzle for holding water is placed 24" above the center of the material. The plane of the surface of the sample is placed at a 45° angle with the horizontal.
3. 500 ml of water at a temperature of 80+ or −2° F. are poured quickly into the funnel and allowed to spray onto the specimen.
4. As rapidly as possible, the sample is removed from the hoops and placed between two sheets of blotting paper on a flat horizontal surface. A metal roller approximately 4½" long and weighing 2¼ pounds is rolled quickly forward and back one time over the paper without application of any pressure other than the weight of the roller.
5. A square having dimensions of 4"×4" is cut out of the center of the sample and weighed to the nearest 0.05 grams. Not more than 30 seconds shall elapse between the time the water has ceased flowing through the spray nozzle and the start of the weighing.
6. The same 4"×4" square sample is then left in a conditioning room until it has dried and reached moisture equilibrium with the surrounding atmosphere. The sample is then weighed again.
7. The water absorbed shall be calculated as follows:

$$\text{water absorption percent} = \frac{W - O}{O} \times 100$$

herein W is the weight of the wet sample and O is the weight of the dried sample. The water absorption rating of the sample is the average of the results obtained from the three specimens tested.

Water Repellency: Tumble Jar Dynamic Absorption Test

The following test also measures the resistance of materials to wetting by water. It is particularly suitable for measuring the water-repellent efficacy of finishes applied to fabrics, because the test subjects the treated fabrics to dynamic conditions similar to those often encountered during actual use. The test conforms to AATCC TM70-2015.

According to the present invention, the following is the procedure used to determine the dynamic water absorption rating of a material.

1. During the test, two specimen sets are tested. Each specimen set consists of five 8"×8" pieces of the material. For each piece that is cut, the corner yarns are removed and, if necessary, a drop of liquid latex or rubber cement is placed at the corners to prevent raveling. Prior to testing, each piece of material is conditioned at 65+ or −2% relative humidity and at 70+ or −2° F. for a minimum of four hours. Blotting paper to be used later is also conditioned.
2. The five pieces of each specimen set are rolled together and weighed to the nearest 0.1 gram.
3. Two liters of distilled water at 80+ or −2° F. is poured into the tumble jar of a dynamic absorption tester. The dynamic absorption tester should consist of a motor driven, 6 liter cylindrical or hexagonal-shaped jar approximately 6" in diameter and 12" in length, mounted to rotate end over end at 55+ or −2 rpm with a constant tangential velocity. The jar may be of glass, corrosion resistant metal, or chemical stoneware.
4. Both specimen sets are placed into the jar and the jar is rotated in the tester for 20 minutes.
5. A piece of one specimen set is then immediately passed through a ringer at a rate of 1" per second with the edge of the piece parallel to the rolls. The piece is sandwiched between two pieces of unused blotter paper and passed through the ringer again. The piece is left sandwiched between the wet blotters. The process is then repeated for the remaining four pieces of the specimen set. The blotters are removed and the five pieces are rolled together, put in a tared plastic container or gallon-sized zippered plastic bag and the wet specimen set is weighed to the nearest 0.1 gram. The mass of the wet specimen set should not be more than twice its dry mass.
6. Step number five is repeated for the second specimen set.
7. The dynamic water absorption for each specimen set is calculated to the nearest 0.1% using the following equation:

$$WA=(W-C)/C\times 100$$

where

WA=water absorbed, percent

W=wet specimen weight, g

C-conditioned specimen weight, g.

8. The dynamic water absorption of the material is determined by averaging together the water absorbed by each of the two specimen sets.
9. According to the present invention, the dynamic water absorption rating of the material can be determined after laundering the samples in accordance with NFPA 1971, 8-1.2. For instance, the samples can be tested after 10 laundry cycles and after 20 laundry cycles to determine the durability of the water resistant coating.

DETAILED DESCRIPTION

It is to be understood by one of ordinary skill in the art that the present discussion is a description of exemplary embodiments only, and is not intended as limiting the broader aspects of the present disclosure.

In general, the present disclosure is directed to protective garments that provide heat and flame resistance to a wearer. The present disclosure is also directed to a fabric that can be incorporated into a protective garment. For instance, the fabric can comprise any suitable woven, knit or non-woven material. The fabric can also be positioned in any suitable location within a protective garment. For example, the fabric can comprise an outer shell material of the protective garment, which includes protective garments made from a single fabric layer. Alternatively, the fabric can comprise a liner material for a protective garment or may comprise one or more inner fabric layers contained within a multiple layer garment construction.

The fabric generally contains flame resistant fibers, particularly inherently flame resistant fibers. In accordance with the present disclosure, the fabric material is treated with a durable water resistant treatment. In one embodiment, the fabric material can be impregnated with a durable water resistant treatment. The durable water resistant treatment can be applied to the fabric material using any suitable method or technique. For instance, the fabric material can be dipped into a bath containing the durable water resistant treatment. Alternatively, the durable water resistant treatment can be sprayed or printed on to the fabric material.

The durable water resistant treatment prevents water and moisture from being absorbed by the fabric material. In accordance with the present disclosure, the durable water resistant treatment is free or substantially free from fluorocarbon chemicals. Although the durable water resistant treatment of the present disclosure contains little to no fluorocarbon chemicals, fabrics treated with the durable water resistant treatment are remarkably and unexpectedly durable and capable of withstanding multiple laundry cycles.

Various protective garments may be made in accordance with the present disclosure. As used herein, a protective garment refers to any article of clothing or article that is worn on the body and it can include any part of a protective ensemble. The protective garments include, for instance, footwear, trousers, jackets, coats, shirts, headwear, gloves, and the like. The fabric can also be used to construct one-piece jumpsuits, which may be well suited for use in industrial settings. Protective garments made in accordance with the present disclosure include, for instance, military garments, tactical garments, firefighter garments, industrial garments, and the like whether the garments are made from multiple layers or from a single layer of fabric.

The garments can be constructed so as to be worn in all types of environments and can be worn by people with different occupations. In one embodiment, the garment may comprise a military garment, such as a battledress uniform. The garment may also comprise various other military apparel, such as flight suits, military jackets, military parkas, and the like.

In one embodiment, the fabric may be used to construct a garment worn by firefighters. For instance, referring to FIG. 1, one embodiment of a fireman turnout coat 10 constructed in accordance with the present disclosure is illustrated. Garment 10 includes a relatively tough outer shell 12 having a liner assembly 14 located therein. Outer shell 12 and liner assembly 14 together function to protect a wearer from heat and flame such as may be encountered during firefighting activities.

In the illustrated embodiment, liner assembly 14 is constructed as a separate unit that may be removed from outer shell 12. A zipper 16 is provided for removably securing liner assembly 14 to outer shell 12. It should be appreciated, however, that other suitable means of attachment, including a more permanent type of attachment such as stitches, may also be used between liner assembly 14 and outer shell 12.

Figure 2:
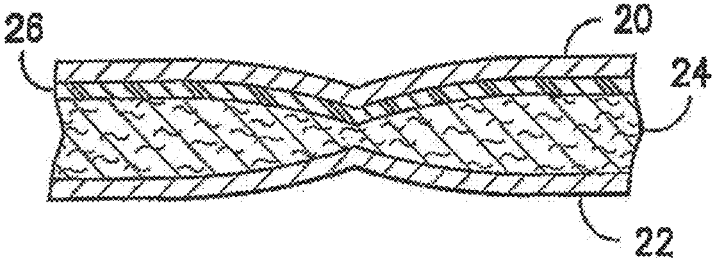
FIG. 2 is a cross-sectional view of an inner liner incorporated into the garment illustrated in FIG. 1.

The construction of protective garment 10 is more particularly illustrated in FIG. 2. As shown, liner assembly 14 includes a plurality of material layers quilted together. The outermost layers, i.e. lining layers 20 and 22, are connected together about their respective peripheries to form an inner cavity. A thermal barrier layer 24 and a moisture barrier layer 26 are located within the inner cavity, as shown. Typically, lining layer 20 will be adjacent the wearers body during use, whereas lining layer 22 will be adjacent outer shell 12.

Thermal barrier layer 24 can be made from various materials. For instance, an aramid felt, such as a felt produced from NOMEX meta-aramid fibers obtained from DuPont can be used. The felt functions as an insulator to inhibit transfer of heat from the ambient-environment to the wearer.

Moisture barrier 26 is preferably a suitable polymeric membrane that is impermeable to liquid water but is permeable to water vapor. Moisture barrier layer 26 is designed to prevent water contacting the exterior surface of garment 10 from reaching the wearer while at the same time permitting the escape of perspiration from the wearer.

In the embodiment described above, the fireman turnout coat 10 includes multiple layers. In other embodiments, however, it should be understood that a coat or jacket made in accordance with the present disclosure may include a single layer or may include an outer shell attached to a liner. For example, wildland firefighter garments are typically one or two layers.

Figure 3:
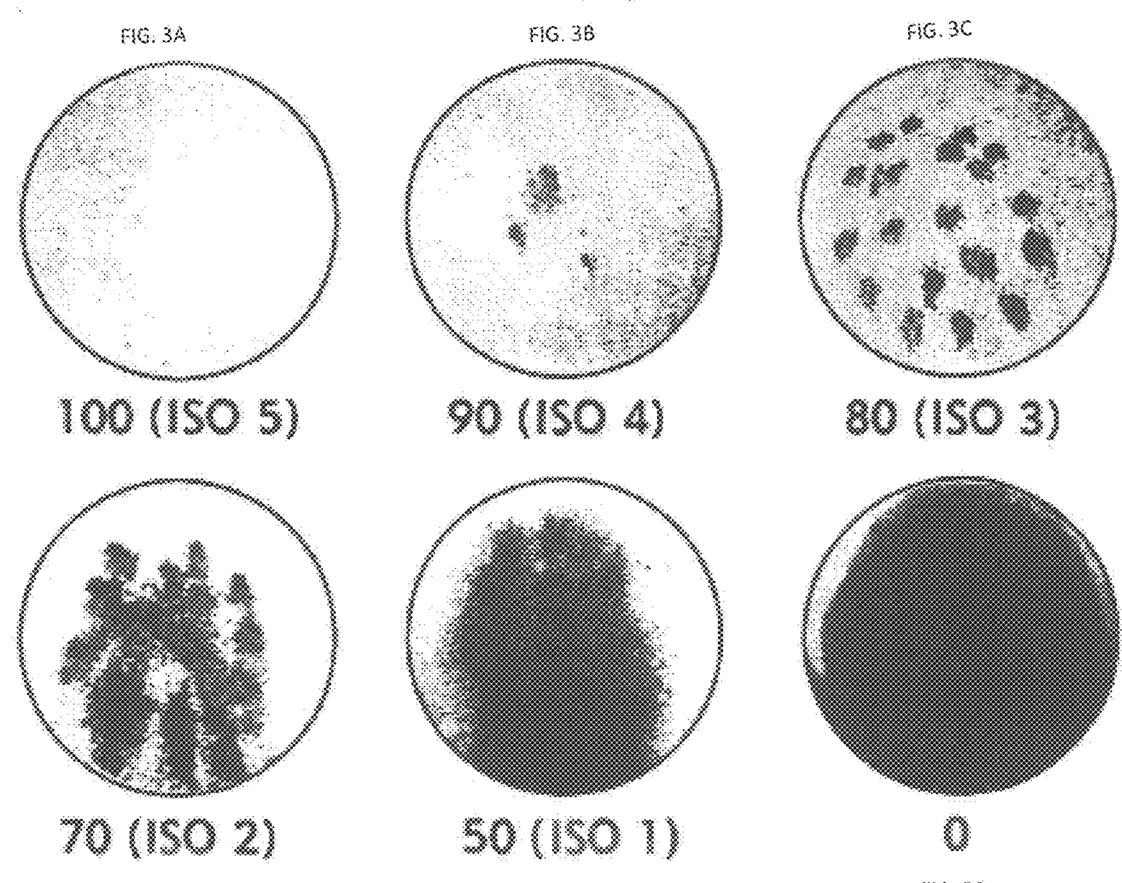
FIGS. 3A-3F are diagrammatical views of illustrative examples of spray ratings for a standardized fabric spray test.
Figure 4:
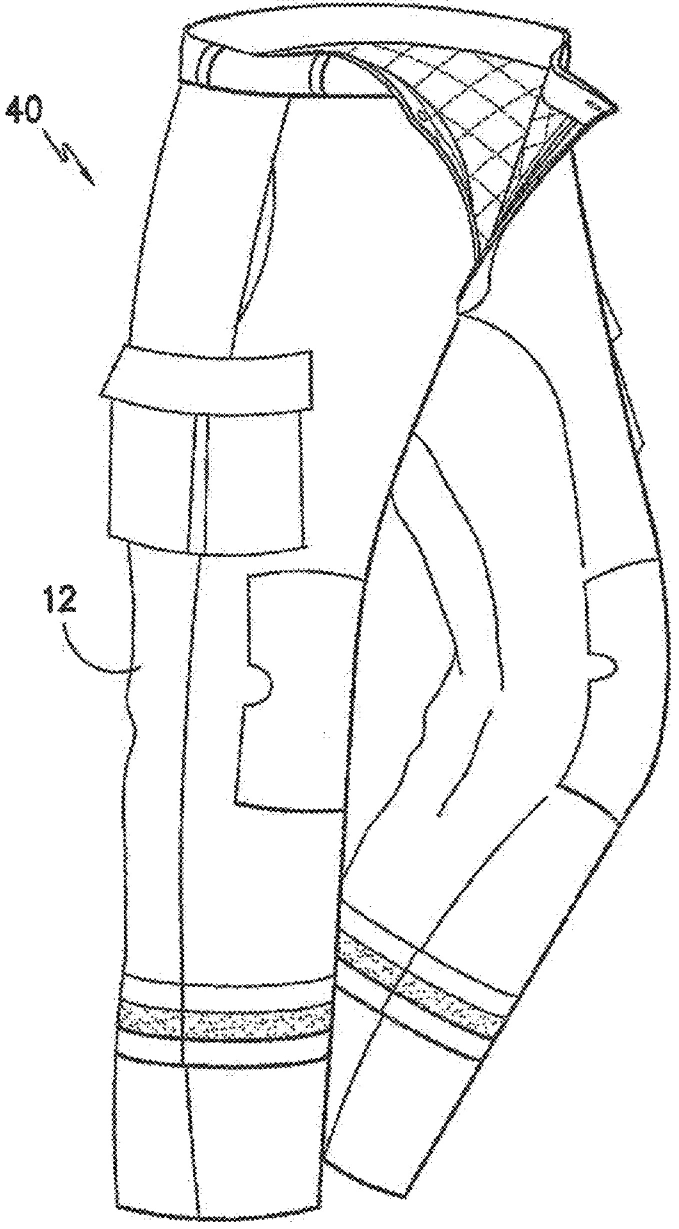
FIG. 4 is a perspective view of one embodiment of a protective garment comprising trousers made in accordance with the present disclosure.

Referring to FIG. 3, a pair of trousers made in accordance with the present disclosure is shown. The trousers 40 as shown in FIG. 3 can be used in conjunction with the turnout coat 10 illustrated in FIG. 1. The trousers 40 also include an outer shell 12 made from the fabric of the present disclosure.

Any of the fabric layers illustrated in the figures can be treated in accordance with the present disclosure. For instance, the outer shell 12, the lining layer 20, the lining layer 22, and/or the thermal barrier layer 24 as shown in FIGS. 1 and 3 can be treated in accordance with the present disclosure with a durable water resistant treatment that is free of fluorocarbon chemicals. The fabric material can be a woven or knitted fabric and, in one embodiment, contains inherently flame resistant fibers. For example, the fabric material can contain inherently flame resistant fibers in an amount greater than about 50% by weight, such as in an amount greater than about 60% by weight, such as in an amount greater than about 70% by weight, such as in an amount greater than about 80% by weight, such as in an amount greater than about 90% by weight, such as in an amount greater than about 95% by weight. In one embodiment, for instance, the fabric material is made exclusively from inherently flame resistant fibers or contains inherently flame resistant fibers in an amount up to about 97% by weight, such as about 98% by weight. The inherently flame resistant fibers can include, for instance, aramid fibers such as para-aramid fibers and/or meta-aramid fibers. Other inherently flame resistant fibers include polybenzimidazole (PBI) fibers or poly(p-phenylene-2,6-bezobisoxazole) (PBO fibers) and the like. In one embodiment, for instance, the fabric material only contains aramid fibers such as para-aramid fibers alone or in combination with meta-aramid fibers. In still another embodiment, the fabric material contains only meta-aramid fibers. In still another embodiment, the fabric material contains aramid fibers in combination with PBI fibers. The PBI fibers can be present in the fabric material, for instance, in an amount greater than about 20% by weight, such as in an amount greater than about 25% by weight, such as in an amount greater than about 30% by weight, such as in an amount greater than about 35% by weight, such as in an amount greater than about 40% by weight, such as in an amount greater than about 45% by weight, such as in an amount greater than about 50% by weight, and generally in an amount less than about 70% by weight, such as in an amount less than about 60% by weight.

In addition to any of the inherently flame resistant fibers described above, the fabric material may contain other fibers. For instance, the fabric material may also include fibers treated with a flame retardant such as FR cellulose fibers including FR viscose fibers and FR rayon fibers. In addition, the fabric material may include antistatic fibers, nylon fibers, and the like. For example, a fabric materials treated in accordance with the present disclosure can contain nylon fibers in an amount up to about 20% by weight. For instance, nylon fibers can be present in an amount of from about 18% to about 2% by weight, such as from about 15% to about 8% by weight.

The yarns used to produce the fabric material can vary depending upon the particular application and the desired result. In one embodiment, for instance, the fabric material may contain only spun yarns, may contain only filament yarns, or may contain both spun yarns and filament yarns. The number ratio between spun yarns and filament yarns, for instance, can be from about 1:1 to about 10:1. For example, in one embodiment, the fabric material may contain spun yarns to filament yarns in a number ratio of from about 2:1 to about 4:1. When the fabric material is a woven fabric, the fabric can have any suitable weave such as a plain weave, a twill weave, a rip stop weave, or the like.

In one embodiment, the filament yarns may be made from an inherently flame resistant material. For example, the filament yarns may be made from an aramid filament, such as a para-aramid or a meta-aramid filament.

In other embodiments, the filament yarns may be made from other flame resistant materials. For instance, the filament yarns may be made from poly-p-phenylenebenzobisoxazole fibers (PBO fibers), and/or FR cellulose fibers, such as FR viscose filament fibers.

The filament yarns can be combined with spun yarns. Alternatively, the fabric material can be made using only filament yarns or only spun yarns. In accordance with the present disclosure, the spun yarns, in one embodiment, may contain polybenzimidazole fibers alone or in combination with other fibers. For example, in one embodiment, the spun yarns may contain polybenzimidazole fibers in combination with aramid fibers, such as para-aramid fibers, meta-aramid fibers, or mixtures thereof.

Instead of or in addition to containing polybenzimidazole fibers, the spun yarns may contain aramid fibers as described above, modacrylic fibers, preoxidized carbon fibers, melamine fibers, polyamide imide fibers, polyimide fibers, and mixtures thereof.

In one particular embodiment, the spun yarns contain polybenzimidazole fibers in an amount greater than about 30% by weight, such as in an amount greater than about 40% by weight. The polybenzimidazole fibers may be present in the spun yarns in an amount less than about 60% by weight, such as in an amount less than about 55% by weight. The remainder of the fibers, on the other hand, may comprise para-aramid fibers.

In one embodiment, various other fibers may be present in the spun yarns. When the fabric is used to produce turnout coats for firemen, the spun yarns can be made exclusively from inherently flame resistant fibers. When the fabric is being used in other applications, however, various other fibers may be present in the spun yarns. For instance, the spun yarns may contain fibers treated with a fire retardant, such as FR cellulose fibers. Such fibers can include FR cotton, FR rayon, FR acetate, FR triacetate, and FR lyocell, and the like. The spun yarns may also contain nylon fibers if desired, such as antistatic fibers.

In one aspect, the fabric treated with the water resistant treatment may comprise an outer shell material. The weight of the outer shell material can vary depending upon the particular type of protective garment being produced. The weight of the outer shell material, for instance, is generally greater than about 4 ounces per square yard, such as greater than about 5 ounces per square yard, such as greater than about 5.5 ounces per square yard, such as greater than about 6 ounces per square yard and generally less than about 8.5 ounces per square yard, such as less than about 8 ounces per square yard, such as less than about 7.5 ounces per square yard.

In another aspect, the fabric material treated in accordance with the present disclosure is a liner fabric. The liner fabric, for instance, can be positioned adjacent to the wearer's body during use. The lining fabric can be made from a combination of spun yarns and filament yarns as described above. The filament yarns can have a size of greater than about 100 denier, such as greater than about 200 denier, and less than about 500 denier, such as less than about 400 denier. In order to increase the lubricity of the liner fabric, the spun yarns and filament yarns can be woven together such that the filament yarns comprise more than about 50% of the surface area of one side of the fabric. For instance, the filament yarns may comprise greater than about 60%, such as greater than about 70%, such as greater than about 80% of one side of the fabric. The side of the fabric with more exposed filament yarns is then used as the interior face of the garment. The filament yarns provide a fabric with high lubricity characteristics that facilitates donning of the garment. For example, the lining fabric can be woven together using a twill weave, such as a 2×1 or 3×1 weave. The lining fabric can have a basis weight of less than about 5 ounces per square yard, such as less than about 4 ounces per square yard, and generally greater than about 2.5 ounces per square yard, such as greater than about 3 ounces per square yard.

In another aspect, the fabric material treated in accordance with the present disclosure is the barrier layer 24 as shown in FIG. 2. Barrier layer 24, for instance, can comprise a batting material, such as a felt. Once treated, the layer 24 can have the same characteristics as described above with respect to spray rating and water absorption.

In accordance with the present disclosure, the fabric material is treated with a durable water resistant treatment. The durable water resistant treatment is free or substantially free from fluorocarbon chemicals. Substantially free, as used herein, indicates that the fabric contains fluorocarbon chemicals in an amount less than about 2% by weight, such as in an amount less than about 1% by weight, such as in an amount less than about 0.5% by weight, such as in an amount less than about 0.25% by weight, such as in an amount less than about 0.1% by weight. In one embodiment, the durable water resistant treatment is free or is substantially free of perfluorinated carboxylic acids, such as free or substantially free of perfluorooctanoic acid. For example, perfluorooctanoic acid or any perfluorinated carboxylic acids may be present in the durable water resistant treatment and/or in a treated fabric in an amount less than about 2% by weight, such as in an amount less than about 1% by weight, such as in an amount of less than 0.5% by weight, such as in an amount less than about 0.25% by weight, such as in an amount less than about 0.1% by weight.

In another embodiment, the durable water resistant treatment can be free or substantially free of polyfluoroalkyl compounds, including C6 compounds. For instance, the durable water resistant treatment and/or the treated fabric can contain one or more polyfluoroalkyl compounds in an amount less than about 2% by weight, such as in an amount less than about 1% by weight, such as in an amount less than about 0.5% by weight, such as in an amount less than about 0.25% by weight, such as in an amount less than about 0.1% by weight.

It was unexpectedly discovered that the durable water resistant treatment of the present disclosure was found to withstand multiple laundry cycles and still provide the desired water resistant properties.

It was also unexpectedly discovered that the durable water resistant treatment of the present disclosure is resistant to hydrocarbon compounds, such as liquids, gels and solids. For instance, once the fabric is contacted with a hydrocarbon compound, such as a polycyclic aromatic hydrocarbon such as benzene, the hydrocarbon compound will wash off the fabric when subjected to a laundry cycle. This result is completely surprising and unexpected.

In accordance with the present disclosure, the durable water resistant treatment contains a binder and/or an extender combined with various other ingredients and components. For instance, the durable water resistant treatment can also include a softener, a repelling agent, or both a softener and a repelling agent.

The binder contained in the durable water resistant treatment, in one embodiment, can comprise a polyurethane polymer. Of particular advantage, the polyurethane polymer can be water-based and thus can be applied to the fabric in an aqueous dispersion. In one embodiment, the polyurethane polymer is an anionic polyurethane. The polyurethane polymer can also be an aliphatic polyurethane. In one particular embodiment, the polyurethane polymer that makes up the binder is a polyester/ether polyurethane polymer, such as an aliphatic polyester/ether polyurethane polymer.

Optionally, the above binder can be combined with an extender. The extender may also comprise a polyurethane polymer. Thus, in one embodiment, the durable water resistant treatment includes a first polyurethane polymer combined with a second polyurethane polymer. The extender, for instance, can comprise a modified polyurethane polymer. For instance, the extender may be a blocked isocyanate, such as an oxime-blocked isocyanate. The extender can be cationic or nonionic. The extender is for further increasing water and oil resistance.

In addition to a binder and/or an extender, in one embodiment, the durable water resistant treatment can further include a softener. The softener, for instance, may comprise an emulsion of a polyalkylene polymer. The softener is generally nonionic. In one embodiment, the softener is a polyethylene polymer, such as a lower molecular weight polyethylene polymer.

In one embodiment, the durable water resistant treatment may also contain a repelling agent. The repelling agent may include an acrylic polymer alone or in combination with a wax, such as a paraffin wax. In one embodiment, the repelling agent may include a polyacrylate that also serves as a binder.

Each of the above ingredients can be combined with water and optionally a wetting agent, such as isopropyl alcohol for application to a fabric. The relative amounts of each component can vary depending on the particular formulation. In one embodiment, for instance, the binder or first polyurethane can be present in relation to the extender or second polyurethane in a weight ratio of from about 5:1 to about 1:2, such as in a weight ratio of from about 4:1 to 1:1. In one embodiment, the binder and extender are present in a weight ratio of from about 3:1 to about 1.5:1 based on the dried weight of the finish. The repelling agent can be present in amounts greater than the binder or the extender. For instance, the weight ratio (based on the dried weight of the finish) between the binder or extender and the repelling agent can be from about 3:1 to about 1:8, such as from about 1:1 to about 1:5, such as from about 1:1.5 to about 1:3.

When included in the formulation, the softener can generally be present in amounts less than the binder, the repelling agent or the extender. For example, in one embodiment, the softener can be present in relation to the binder in a weight ratio of from about 1:1 to about 1:4, such as from about 1:1.5 to about 1:3.

In order to produce a liquid resistant fabric in accordance with the present invention, first, a woven or knitted fabric is constructed or obtained that is suitable for use as a fabric material in a protective garment. As described above, the fabric should be made from flame resistant fibers.

Prior to applying the durable water resistant treatment, the fabric can be first scoured, although scouring may not be necessary for all applications. When scoured, the material can be scoured with an alkaline solution.

After being scoured, the fabric is then put on a tenter frame, dried and heat set. For instance, after scouring, the fabric should be dried so that the moisture level is substantially equivalent to the natural moisture level of the fibers used to make the fabric. For instance, for most fibers, the moisture level should be less than about 10%, and particularly less than about 7%.

After the fabric has been dried and heat set, a durable water resistant composition according to the present disclosure is applied to at least one side of the fabric. Although the composition can be sprayed on the fabric or printed on the fabric, preferably the fabric is dipped into a bath containing the durable water resistant treatment in dispersion form.

The amount of the water-resistant composition applied to the fabric will depend upon the particular formulation and the particular application.

After the durable water resistant treatment is applied to the fabric, the fabric is then heated to a temperature sufficient for the coating to dry and/or cure. Once the durable water resistant treatment is cured and affixed to the fabric, the fabric can then be used in constructing protective garments in accordance with the present disclosure.

In one aspect, the dried finish can contain the binder in an amount greater than about 10% by weight, such as in an amount greater than about 15% by weight, such as in an amount greater than about 20% by weight, and generally in an amount less than about 50% by weight, such as in an amount less than about 40% by weight, such as in an amount less than about 30% by weight. The extender can be present in the dried finish in an amount greater than about 5% by weight, such as in an amount greater than about 8% by weight, such as in an amount greater than about 10% by weight, and generally in an amount less than about 30% by weight, such as in an amount less than about 25% by weight, such as in an amount less than about 20% by weight. The repelling agent can be present in the dried durable water resistant treatment in an amount greater than about 10% by weight, such as in an amount greater than about 20% by weight, such as in an amount greater than about 25% by weight, such as in an amount greater than about 35% by weight and generally in an amount less than about 70% by weight, such as in an amount less than about 65% by weight, such as in an amount less than about 55% by weight. When a softener is present, the softener can be present in the dried treatment in an amount greater than about 5% by weight, such as in an amount greater than about 10% by weight, and generally in an amount less than about 25% by weight, such as in an amount less than about 20% by weight, such as in an amount less than about 15% by weight based upon the weight of the dried water resistant treatment.

Although the durable water resistant treatment contains no fluorocarbon chemicals, the treatment of the present disclosure was unexpectedly found to have excellent water resistant. The durable water resistant treatment is also capable of withstanding multiple laundry cycles.

For example, fabric materials treated in accordance with the present disclosure can have a spray rating of at least 70 or higher, such as at least 80 or higher, such as at least 90 or higher even after ten laundry cycles. In one embodiment, for instance, the fabric can maintain a 100 spray rating after ten laundry cycles.

Similarly, the fabric material can also display excellent resistance to water absorption. For example, when tested according to the water absorption test (NFPA 1971 8.25), the fabric can have a water absorption of about 15% or less, such as about 10% or less, such as about 5% or less, such as about 4% or less, such as about 3% or less, such as about 2% or less, such as about 1% or less.

The above water absorption properties can be retained by the fabric after 5 laundry cycles or even after ten laundry cycles.

In addition to water, fabric material treated in accordance with the present disclosure also provide protection against various chemical agents such as acids, alkaline materials, and artificial blood when tested according to test EN ISO 6530. For example, when tested against a 30% sulfuric acid solution, fabric materials made according to the present disclosure can have an index of repellency of greater than about 85%, such as greater than about 90%, such as greater than about 92%, such as greater than about 94%. The fabric material can have an index of penetration when tested against a 30% sulfuric acid solution of less than about 5%, such as less than about 2%, such as less than about 1%, such as less than about 0.5%. When the fabric material is incorporated into a composite, such as a three layer composite, the index of penetration can be 0%.

When tested against a 10% sodium hydroxide solution, fabric materials made according to the present disclosure can display an index of repellency of greater than about 90%, such as greater than about 92%, such as greater than about 94%, such as greater than about 96%, such as greater than about 97%. The fabric materials can display an index of penetration of less than about 2%, such as less than about 1.5%, such as less than about 1%, such as less than about 0.8%.

Fabric materials made according to the present disclosure also display excellent resistance to artificial blood. When tested against artificial blood, for instance, fabric materials made according to the present disclosure can display an index of repellency of greater than about 85%, such as greater than about 87%, such as greater than about 90%, such as greater than about 92%, such as greater than about 94%. The fabric materials can display an index of penetration against artificial blood of less than about 4%, such as less than about 1.5%, such as less than about 1%, such as less than about 0.8%.

Fabric materials made in accordance with the present disclosure can also display excellent abrasion resistance. For example, a fabric having a basis weight of from about 5 osy to about 9 osy, such as from about 5.5 osy to about 8.5 osy, such as from about 6 osy to about 7.5 osy can have an abrasion resistance of greater than about 90,000 cycles, such as greater than about 95,000 cycles, such as greater than about 98,000 cycles, such as greater than about 100,000 cycles when tested according to ASTM D4966 Test Method. The abrasion resistance is generally less than about 150,000 cycles.

When testing lighter fabrics, such as linear materials, fabric materials made according to the present disclosure can have an abrasion resistance of greater than about 40,000 cycles, such as greater than about 42,000 cycles, such as greater than about 44,000 cycles, such as greater than about 46,000 cycles, such as greater than about 48,000 cycles, and generally less than about 80,000 cycles. The lighter fabric materials, for instance, can have a basis weight of from about 2 osy to about 5 osy, such as from about 2 osy to about 4 osy, such as from about 2.5 osy to about 3.8 osy.

As described above, the durable water resistant treatment of the present disclosure can be formulated to be water-based. The durable water resistant treatment, for instance, can comprise an aqueous dispersion of the different ingredients or components. In addition, the durable water resistant treatment is substantially free of fluorocarbon chemicals. Thus, the durable water resistant treatment of the present disclosure is exceptionally safe for handling and use. In this regard, the durable water resistant treatment of the present disclosure can be applied to the protective garments during their useful life to further reinforce the water resistant properties of the garment. For example, in one embodiment, the durable water resistant treatment can be added to a wash cycle for absorption by the garment. The garment can then be placed in a dryer which causes the durable water resistant treatment to cure and further improve the water resistant properties of the garment. The fabric or fabric layers treated in accordance with the present disclosure can be free or substantially free of fluorine. For example, the fabric or fabric layer treated in accordance with the present disclosure can contain fluorine in an amount less than about 1,000 ppm, such as in an amount less than about 500 ppm, such as in an amount less than about 100 ppm, such as in an amount less than about 50 ppm, such as in an amount less than about 40 ppm, such as in an amount less than about 30 ppm, such as in an amount less than about 20 ppm.

The present disclosure may be better understood with reference to the following examples.

Example No. 1

The following tests were performed in order to demonstrate some of the advantages and benefits of fabrics treated in accordance with the present disclosure.

Three different flame resistant woven fabrics suitable for use as an outer shell material were impregnated with a durable water resistant treatment in accordance with the present disclosure and compared with the same fabric treated with a water resistant treatment containing fluorocarbon chemicals.

The Fabrics that were Tested were as Follows:

Fabric No. 1: Made from para-aramid filament yarns combined with spun yarns. The spun yarns contained an intimate blend of aramid polymer fibers and PBI fibers. The spun yarn to filament yarn ratio was 2:1 and the fabric had a basis weight of 6 osy.

Fabric No. 2: Made from para-aramid filament yarns combined with spun yarns. The spun yarns contained an intimate blend of aramid polymer fibers and PBI fibers. The spun yarn to filament yarn ratio was 3:1 and the fabric had a basis weight of 6 osy.

Fabric No. 3: Made from para-aramid filament yarns combined with spun yarns. The spun yarns contained an intimate blend of aramid polymer fibers and PBI fibers. The spun yarn to filament yarn ratio was 4:1 and the fabric had a basis weight of 6.5 osy.

Each of the above fabrics was scoured and heat set. Durable water resistant treatments were applied to the fabric by dipping the fabric in the durable water resistant treatment and then drying the fabric.

The following durable water resistant treatments were tested:

| Sample No. | Composition |
|---|---|
| 1 | Durable water resistant treatment containing fluorocarbon chemicals |
| 2 | 64 gals. water; 4 gals. of an emulsion of a polyalkylene; 6 gals. of an aliphatic polyester/ether polyurethane; 2 gals. wetting agent (isopropyl alcohol); 18 gals. dispersion of paraffin wax and acrylic polymer; and 6 gals. of a dispersion of a modified polyurethane comprising a blocked isocyanate |

The above-treated fabrics were tested for spray rating according to Test AATCC TM22-2017 and tested for water absorption according to Test NFPA 1971-2018 8.25 initially and after multiple laundering cycles. The following results were obtained:

| Spray Rating | | | | | |
|---|---|---|---|---|---|
| Fabric | Sample No. | Initial | 3X | 6X | 10X |
| 1 | 1 | 100 | 100 | 100 | 100 |
| | 2 | 100 | 90 | 100 | 90 |
| 2 | 1 | 100 | 100 | 100 | 100 |
| | 2 | 100 | 100 | 100 | 100 |
| 3 | 1 | 100 | 100 | 100 | 100 |
| | 2 | 100 | 70 | 100 | 70 |

| Water Absorption (%) | | | | |
|---|---|---|---|---|
| Fabric | Sample No. | Initial | 6X | 10X |
| 1 | 1 | 2.0 | 2.3 | 2.1 |
| | 2 | 1.6 | 0.7 | 0.7 |
| 2 | 1 | 0.5 | 1.2 | 0.9 |
| | 2 | 0.7 | 0.9 | 0.4 |
| 3 | 1 | 0.9 | 1.3 | 0.8 |
| | 2 | 1.5 | 0.0 | 0.0 |

As shown above, fabrics treated in accordance with the present disclosure had excellent water repellency properties even in comparison to fabrics treated with a fluorocarbon chemical.

Example No. 2

In the following example, various fire resistant fabrics were treated in accordance with the present disclosure and tested for fluorine content in comparison to various commercial fabrics treated with a water resistant treatment containing fluorocarbon chemicals.

The Fabrics that were Tested were as Follows:

Sample Nos. C1 and C2: Made from para-aramid filament yarns combined with spun yarns. The spun yarns contained an intimate blend of aramid polymer fibers and PBI fibers. The spun yarn to filament yarn ratio was 2:1 and the fabric had a basis weight of 6 osy.

Samples Nos. C3, C4, 8, 9, and 10: Made from para-aramid filament yarns combined with spun yarns. The spun yarns contained meta-aramid polymer fibers. The spun yarn to filament yarn ratio was 1:4 and the fabric had a basis weight of 6.5 osy.

Samples Nos. 5, 6 and 7: Made from para-aramid filament yarns combined with spun yarns. The spun yarns contained an intimate blend of aramid polymer fibers and PBI fibers. The spun yarn to filament yarn ratio was 2:1 and the fabric had a basis weight of 7 osy.

Sample No. 11: Made from 100% meta-aramid warp yarns and filling yarns containing 80% meta-aramid fibers combined with 20% by weight FR viscose fibers. The fabric is woven such that the face contains meta-aramid fibers in an amount of 93% by weight and FR viscose fibers in an amount of 7% by weight. The face of the fabric was tested for the sample.

Sample No. 12: Made from 100% meta-aramid warp yarns and filling yarns containing 80% meta-aramid fibers combined with 20% by weight FR viscose fibers. The back of the fabric contained meta-aramid fibers in an amount of 87% by weight and FR viscose fibers in an amount of 13% by weight. The back of the fabric was tested for the sample.

Sample Nos. C1, C2, C3 and C4 were commercial products treated with a water resistant treatment containing fluorocarbon chemicals.

Sample Nos. 5-12 were treated with the same durable water resistant treatment described in Example No. 1 above for Sample No. 2. The durable water resistant treatment was substantially free of fluorocarbon chemicals.

Fluorine content in the resulting fabric was tested using particle-induced gamma emission (PIGE). PIGE is a form of nuclear reaction analysis using an ion beam analysis through thin-film analytical techniques. An MeV proton beam is projected on to a sample and the protons excite the target nuclei such that gamma rays are emitted which can produce a spectrum for determining fluorine content.

The following results were obtained.

| Sample No. | Fluorine (PPM) |
|---|---|
| C1 | 9569 |
| C2 | 8434 |
| C3 | 8927 |
| C4 | 10277 |
| 5 | 16 |
| 6 | 11 |
| 7 | 11 |
| 8 | 23 |
| 9 | 16 |
| 10 | 13 |
| 11 | 33 |
| 12 | 19 |

As shown above, fabrics made according to the present disclosure are substantially free of fluorine and contain fluorine in an amount less than 100 ppm.

Example No. 3

In the following example, fabrics treated in accordance with the present disclosure and an untreated fabric were tested for chemical resistance according to test EN ISO 6530. In particular, the fabrics were treated against a 30% sulfuric acid solution, against a 10% sodium hydroxide solution, and against artificial blood.

Three Different Fabrics were Tested as Follows:

Sample No. 13 was an untreated fabric. The fabric was made from para-aramid filament yarns combined with spun yarns. The spun yarns contained an intimate blend of aramid fibers. The spun yarn to filament yarn ratio was 1:1. The fabric had a basis weight of 6.5 osy.

Sample No. 14 was made from the same fabric as described with respect to Sample No. 13 only treated in accordance with the present disclosure as described in Example No. 1 above.

Sample No. 15 was also treated in accordance with the present disclosure and contained a fabric made from para-aramid filament yarns combined with spun yarns. The spun yarns contained an intimate blend of aramid polymer fibers and PBI fibers. The spun yarn to filament yarn ratio was 2:1 and the fabric had a basis weight of 7 osy.

Sample No. 16 contained the treated fabric of Sample No. 14 incorporated into a three layer composite. The composite further included a face cloth and a moisture barrier positioned between the face cloth and the treated fabric.

Each fabric was tested for index of repellency, index of absorption, and index of penetration. The following results were obtained:

| Test specimen | | | Sample No. 13 | Sample No. 15 | Sample No. 14 | Sample No. 16 |
|---|---|---|---|---|---|---|
| Chemicals | Acid (Sulfuric acid 30%) | Index of repellency (%) | 74.3 | 99.2 | 96.2 | 94.8 |
| | | Index of absorption (%) | 10.9 | 1.4 | 1.6 | 3.5 |
| | | Index of penetration (%) | 14.4 | 0.2 | 0.1 | 0 |
| | Alkalis (Sodium Hydroxide 10%) | Index of repellency (%) | 88.9 | 98.1 | 98.2 | 97.8 |
| | | Index of absorption (%) | 4.4 | 1.2 | 0.8 | 1.8 |
| | | Index of penetration (%) | 6.8 | 0.3 | 0.5 | 0 |
| | Artificial Blood | Index of repellency (%) | 79.3 | 94.8 | 97.6 | 95.9 |
| | | Index of absorption (%) | 11.9 | 3.6 | 3.4 | 2 |
| | | Index of penetration (%) | 12.6 | 0.7 | 0.4 | 0 |

Example No. 4

In this example, a lining material or thermal linear was treated in accordance with the present disclosure and tested for various properties. An untreated sample was also tested.

Sample No. 17 in the table below was an untreated thermal linear. The thermal linear was made from meta-aramid fibers.

Sample No. 18 in the table below was made from the same fabric as Sample No. 17 but treated with the composition described in Example No. 1.

The following results were obtained:

| Test Results | | | Sample | Sample |
|---|---|---|---|---|
| Test Method | Test name | Unit | No. 17 | No. 18 |
| AATCC 193 | Water Repellency | AATCC Scale | 0 | 4 |
| AATCC 22 | Spray Rating | AATCC Scale | 50 | 100 |
| AATCC 22 (AATCC 135) | Spray Rating 5X | AATCC Scale | 50 | 100 |
| ASTM D 3776 | Weight | OZ_SQ_YD | 2.94 | 3.09 |
| NFPA 1971 8.25 | Water Absorption | Percent | 44 | 2 |

Example No. 5

The following example demonstrates the ability of the fabric treatment in accordance with the present disclosure to increase abrasion resistance.

In particular, fabric Sample Nos. 13 and 14 and fabric Sample Nos. 17 and 18 were tested for abrasion resistance according to ASTM D4966 Test Method. Sample Nos. 13 and 14 represent outer shell fabrics, while Sample No. 17 and 18 represent inner liner fabrics. The following results were obtained:

| Sample No. | Abrasion Resistance (Cycles) |
|---|---|
| 13 | 70,000-80,000 |
| 14 | 100,000+ |
| 17 | 30,000-40,000 |
| 18 | 40,000-50,000 |

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A fabric for constructing protective garments comprising:

a fabric material comprised of yarns, the yarns comprising only spun yarns or a combination of spun yarns and filament yarns, the yarns comprising inherently flame resistant fibers, the inherently flame resistant fibers comprising meta-aramid fibers, para-aramid fibers, polybenzimidazole fibers, poly(p-phenylene-2,6-benzobisoxazole) fibers, or mixtures thereof, the fabric material containing inherently flame resistant fibers in an amount greater than about 60% by weight, the fabric material being treated with a durable water resistant treatment, the durable water resistant treatment being substantially free of fluorocarbon chemicals, the durable water resistant treatment comprising a polyurethane polymer, an acrylic polymer, a blocked isocyanate, optionally a softener, and a paraffin, wherein the polyurethane polymer comprises an aliphatic polyester/ether polyurethane polymer, and wherein the durable water resistant treatment comprises about 10% to about 50% by weight of the polyurethane polymer and about 10% to about 70% by weight of a combination of the acrylic polymer and the paraffin, the fabric material having a basis weight of from about 4 osy to about 8 osy, and wherein after being laundered ten times, the fabric material displays a water absorption of less than 10% when tested according to NFPA-1971 and displays a spray rating of greater than 70 when tested according to AATCC 22-2020.

2. A fabric as defined in claim 1, wherein the fabric material maintains a water absorption of less than about 8% after ten laundry cycles.

3. A fabric as defined in claim 1, wherein the durable water resistant treatment comprises the polyurethane, the blocked isocyanate, the softener, and the acrylic polymer.

4. A fabric as defined in claim 1, wherein the durable water resistant treatment comprises an acrylic repelling agent.

5. A fabric as defined in claim 4, wherein the acrylic polymer comprises a polyacrylate.

6. A fabric as defined in claim 4, wherein the durable water resistant treatment further comprises a softener.

7. A fabric as defined in claim 4, wherein the softener comprises a non-ionic polyethylene polymer.

8. A fabric as defined in claim 1, wherein the polyurethane polymer is present in relation to the blocked isocyanate at a weight ratio of from about 5:1 to about 1:2.

9. A fabric as defined in claim 1, wherein the inherently flame resistant fibers contained in the fabric material comprise a mixture of aramid fibers and polybenzimidazole fibers.

10. A fabric as defined in claim 1, wherein the fabric material is comprised of spun yarns and multifilament yarns.

11. A fabric as defined in claim 1, wherein the fabric material is comprised of only spun yarns.

12. A fabric as defined in claim 1, wherein the fabric material exhibits a water absorption of less than 3%.

13. A fabric as defined in claim 1, wherein the fabric material has a basis weight of from about 5 osy to about 8.5 osy.

14. A fabric as defined in claim 10, wherein the multifilament yarns comprise para-aramid yarns or meta-aramid yarns, the spun yarns comprising aramid fibers blended with polybenzimidazole fibers, the polybenzimidazole fibers being present in the spun yarns in an amount greater than about 30% by weight.

15. A fabric as defined in claim 1, wherein the durable water resistant treatment comprises a wetting agent.

16. A fabric as defined in claim 15, wherein the wetting agent comprises an isopropyl alcohol.

17. A fabric as defined in claim 1, wherein the blocked isocyanate comprises an oxime-blocked isocyanate.

* * * * *